Patented Feb. 27, 1945

2,370,570

UNITED STATES PATENT OFFICE 2,370,570

METHALLYL CHLOROFORMATE

Irving E. Muskat, Akron, Ohio, assignor to Pittsburgh Plate Glass Company, Allegheny County, Pa., a corporation of Pennsylvania No Drawing. Application March 28, 1941,
Serial No. 385,776

1 Claim. (Cl. 260—463)

This invention relates to haloformates of unsaturated aliphatic alcohols containing at least 4 carbon atoms and an unconjugated unsaturated group, and is particularly related to the chloroformate of unsaturated aliphatic alcohols containing from 4 to 18 carbon atoms in an aliphatic chain. In accordance with the present invention, I have prepared such chloroformates by reaction of unsaturated alcohols containing one or more unconjugated unsaturated groups such as the alkenyl or alkynyl alcohols, for example, methallyl, crotyl, oleyl,2-chlorallyl, propargyl, methyl vinyl carbinyl, vinyl allyl carbinyl, linoleyl, or citronellyl or tiglyl alcohol, 3-chloro 2 butenol 1, 2 ethyl 2 hexenol 1, methallyl isopropenyl carbinol, dimethyl, ethyl or isopropyl ethynyl carbinol, geraniol, or other aliphatic unsaturated alcohol containing 4 or more carbon atoms and at least one unconjugated unsaturated group.

The new chloroformates may be prepared by reaction of phosgene with the unsaturated alcohol. The reaction is preferably conducted by bubbling phosgene into the alcohol, in many cases at a temperature below about 35° C. The chloroformates may then be recovered by washing the mixture with water and/or neutral solutions of various salts such as sodium chloride solutions and drying over a suitable dehydration agent such as calcium chloride, and the washed reaction product may be further purified by distillation, if desired. Other haloformates may be prepared from other carbonyl halides such as carbonyl bromide or iodide.

The haloformates of unsaturated alcohols containing at least 4 carbon atoms are generally colorless liquids, although in some cases they may be solids. They have the general formula

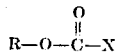

where R represents an unsaturated aliphatic radical containing one or more unconjugated unsaturated group and at least 4 carbon atoms and where X represents halogen. In many cases, these liquids have a very pungent irritating odor and as in the case of methallyl chloroformate, they may be lachrymatory. In general, they are miscible with common solvents such as ethyl or methyl alcohol, xylene, benzene, toluene, etc. The liquids have high boiling points and upon distillation tend to decompose, particularly in the presence of moisture. The compounds are capable of numerous uses, for example, as solvents for organic compounds, plasticizers for paint and resinous compositions such as phenol condensation products, methyl, ethyl, or benzyl cellulose, cellulose acetate or acetobutyrate or other cellulose plastic, allyl or vinyl resins such as polyvinyl acetate, butyral, etc., or polymerized diallyl phthalate, oxalate, carbonate, succinate, adipate, etc.

The following examples are illustrative:

Example I

Phosgene was bubbled into a flask containing methallyl alcohol at a rate of 20 millimoles per minute while agitating the mixture and cooling to a temperature below about 10° C. After phosgene in the proportion of about 0.8 mole of phosgene per mole of methallyl alcohol had been introduced, the mixture was allowed to stand for one hour. Thereafter, the reaction mixture was washed with water and methallyl chloroformate was recovered. This compound has an index of refraction at 20° C. of 1.427 and a boiling point of approximately 130° C. at atmospheric pressure.

Example II

Phosgene was bubbled into a flask containing crotyl alcohol at a rate of 20 millimoles per minute while agitating the mixture and cooling to a temperature below about 10° C. After phosgene in the proportion of about 0.8 mole of phosgene per mole of crotyl alcohol had been introduced, the mixture was allowed to stand for one hour. Thereafter, the reaction mixture was washed and recovered as in Example I, an oily high boiling liquid being obtained.

While the invention has been described with particular reference to chloroformate, other corresponding haloformates such as the bromoformates or the corresponding fluoro or iodo compounds may be prepared. For example, the corresponding bromoformates may be prepared from carbonyl bromide and an unsaturated alcohol. Pyridine, quinoline, or alkali metal or alkaline earth metal hydroxides, carbonates, or bicarbonates may be used to assist the reaction, if required, although in many cases these agents are found to be unnecessary in the preparation of haloformates.

Although the present invention has been described with reference to the specific details of certain embodiments thereof, it is not intended that such details shall be regarded as limitations upon the scope of the invention except insofar as included in the accompanying claim.

I claim:

Methallyl chloroformate.

IRVING E. MUSKAT.